United States Patent [19]

Habermann et al.

[11] 4,392,693

[45] Jul. 12, 1983

[54] REDUNDANT ACTIVE ELECTROMAGNETIC BEARING

[75] Inventors: Helmut Habermann; Maurice Brunet, both of Vernon, France

[73] Assignee: Societe Europenne de Propulsion, Vernon, France

[21] Appl. No.: 352,265

[22] Filed: Feb. 25, 1982

[30] Foreign Application Priority Data

Mar. 9, 1981 [FR] France .................................. 81 04646

[51] Int. Cl.[3] .............................................. F16C 39/00
[52] U.S. Cl. ...................................... 308/10; 324/208
[58] Field of Search ......................... 308/10; 324/208; 73/517; 104/281, 284, 291, 290; 74/5.46

[56] References Cited

U.S. PATENT DOCUMENTS

| | | | |
|---|---|---|---|
| 3,508,444 | 4/1970 | Sitomer | 308/10 |
| 3,593,307 | 7/1971 | Gouge | 340/172.1 |
| 3,886,871 | 6/1975 | Ross | 308/10 |
| 3,891,285 | 6/1975 | Atkinson | 73/517 B |
| 3,937,533 | 2/1976 | Veillette | 308/10 |
| 3,968,753 | 7/1976 | Breitling | 104/284 |
| 4,047,439 | 9/1977 | Russell | 310/10 |
| 4,121,143 | 10/1978 | Habermann | 308/10 |
| 4,170,904 | 10/1979 | Fischell | 308/10 |

FOREIGN PATENT DOCUMENTS

| | | | |
|---|---|---|---|
| 2655006 | 8/1977 | Fed. Rep. of Germany | 308/10 |
| 2011595 | 3/1970 | France | 308/10 |
| 2384174 | 3/1977 | France | 308/10 |

*Primary Examiner*—R. Skudy
*Attorney, Agent, or Firm*—Fitzpatrick, Cella, Harper & Scinto

[57] ABSTRACT

The present invention relates to an active electromagnetic bearing comprising first and second sets of electromagnet coils, the two sets of coils being so placed on one armature that on each double-pole part of armature are wound one coil of the first set and one coil of the second set and that the successive coils of the first set are all wound in the same direction whereas the coils of the second set which duplicate the coils of the first set are alternately wound in the same direction and in opposite directions with respect to the corresponding coils of the first set, a detector for sensing the position of the movable member and a control circuit being associated with each set of coils, and switch-over means being provided for connecting either set of coils with the corresponding control circuit in response to a control signal.

6 Claims, 3 Drawing Figures

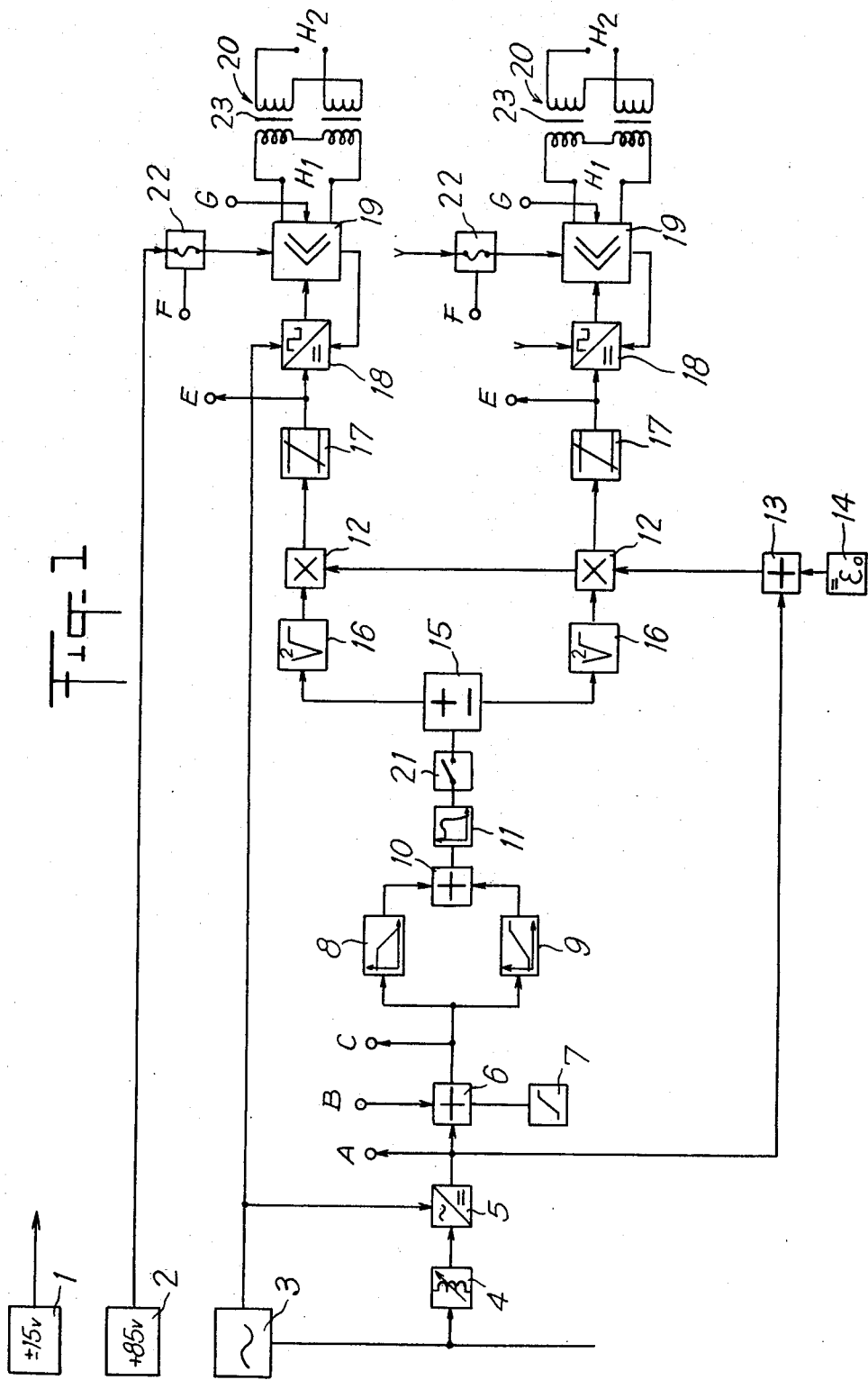

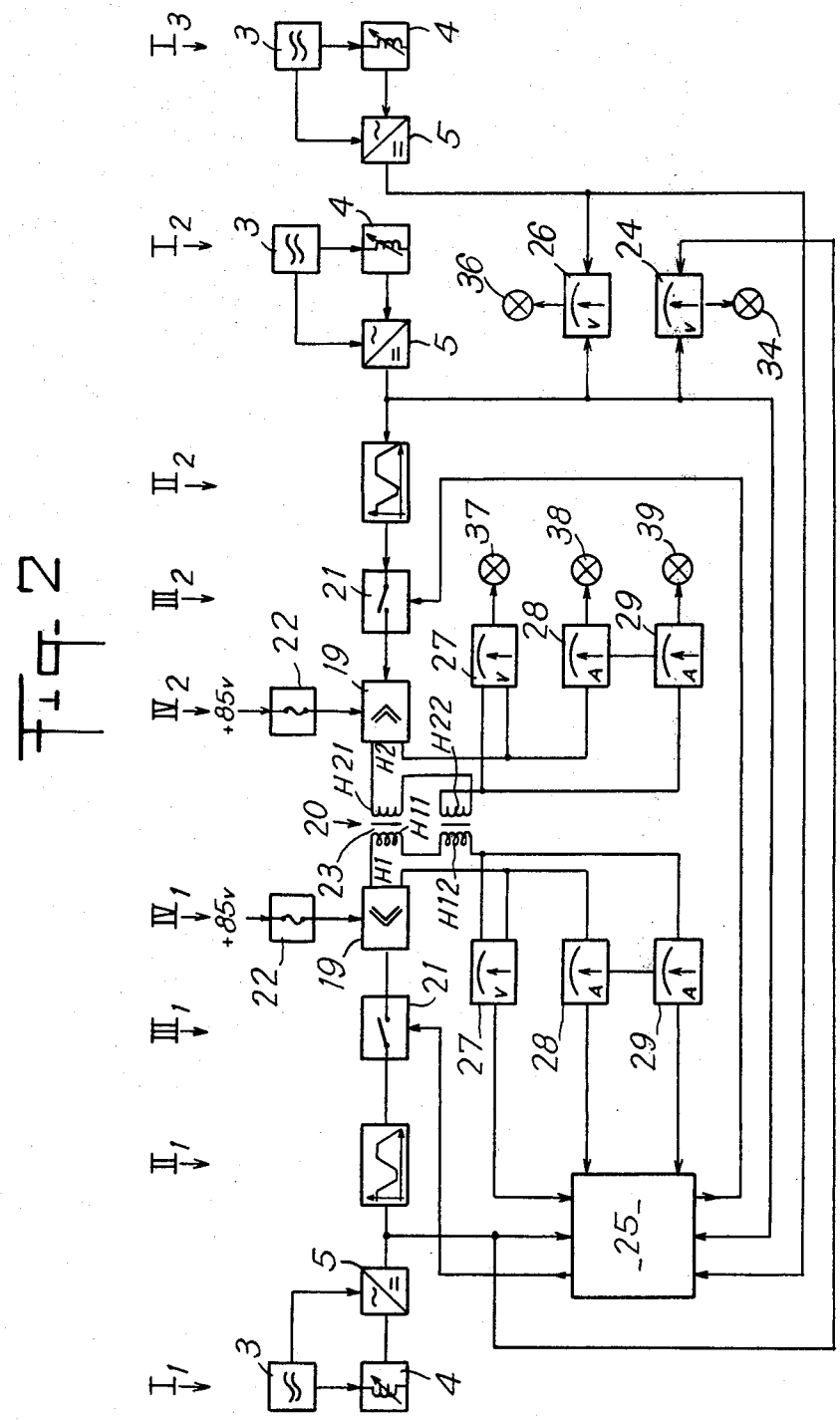

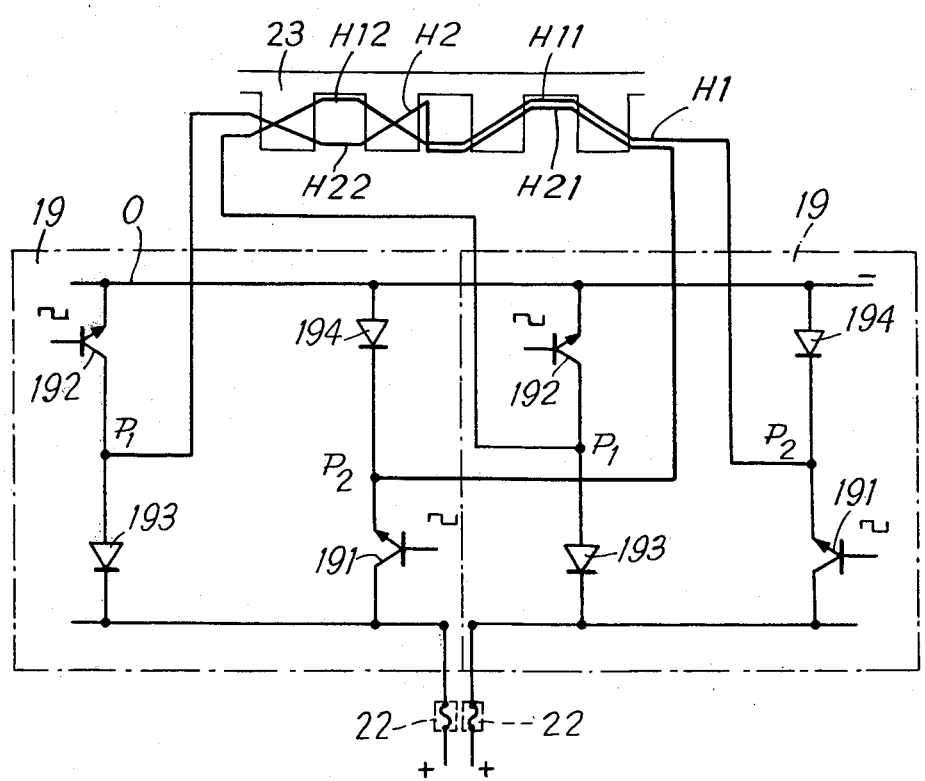

REDUNDANT ACTIVE ELECTROMAGNETIC BEARING

The present invention relates to a redundant active electromagnetic bearing designed to support a movable member, comprising at least a set of electromagnet coils cooperating with an armature, at least a detection device for sensing the position of the movable member with respect to a frame, and at least a control circuit connected to the detection device and to the said set of coils for controlling the supply to said coils in response to signals delivered by the detection device in order to keep the movable member in a predetermined position.

For numerous applications, reliability is an essential quality. For example, in the case of electromagnetic suspensions of movable members such as rotors, it is often necessary to guard against any possible failures of the mechanical, electrical and electronical assemblies which constitute an active electromagnetic bearing, and to avoid any interruption, which always proves costly, in the operation of a machine equipped with such bearings, should such failures occur. Because of this, entirely redundant suspensions have already been produced which comprise two sets of identical electromagnetic bearings placed side by side. It is thus possible to start operating the bearings of the second set of bearings if either bearing in the first set of bearings normally used is not working properly. Such a procedure often proves to be expensive and unsatisfactory because of the space occupied by two entirely separate bearings placed one next to the other.

It is precisely the object of the present invention to overcome the aforesaid disadvantages and to propose a system of magnetic suspension which, whilst using a redundancy of means in order to increase reliability, remains however simpler, less expensive and less voluminous than the prior art devices.

These objects are reached according to the invention with a redundant active electromagnetic bearing which comprises first and second sets of electromagnet coils, the two sets of coils being so placed on one armature that on each double-pole part of the armature are wound one coil of the first set and one coil of the second set and that the successive coils of the first set are all wound in the same direction whereas the coils of the second set which duplicate the coils of the first set are alternately wound in the same direction and in opposite directions with respect to the corresponding coils of the first set, a detector for sensing the position of the movable member and a control circuit being associated with each set of coils, and switch-over means being provided for connecting either set of coils with the corresponding control circuit in response to a control signal.

The assembly produced according to the present invention, thus combines two electromagnetic bearings on a single armature and permits considerable reduction of the volume without affecting the reliability of operation, since the elements which could be liable to failures, namely the coils or the elements from the associated electric or electronic circuits, are effectively duplicated.

The fact of providing two sets of coils on the same magnetic circuit such as explained hereinabove, not only permits to permanent use of the whole magnetic surface of the armature, but it also proves especially advantageous insofar as it permits use of switch-over means which do not directly act on the electromagnet coils traversed by strong current, but which are inserted in the control circuits themselves to selectively authorize the effective servo control of the power amplifiers associated with the sets of coils from the position sensing means associated with the control circuits, whilst permitting an uncontrolled power amplifier always to be traversed by a low quiescent current and never be completely off. Such a characteristic which makes it possible to carry out a switch-over at a circuit level where the currents remain relatively low, thereby avoiding the use of relays for example, is especially made possible by the configuration of the different coils. Indeed, when double coils are made on two pairs of successive poles so that the first set of coils causes the appearance alternately of poles of opposite signs N,S,N,S whereas the second set of coils causes the appearance successively of twice a pole of the same sign N,S,S,N, the short-circuiting of one of the set of coils, for example through failure of the corresponding power amplifier, does not react on the second set of coils. With such a configuration, a working reliability is therefore guaranteed even when the power amplifiers associated with two sets of coils are simultaneously in use, only one amplifier being of course switched over to the corresponding control circuit.

Thus, the special features of the magnetic bearing according to the invention are that the control circuit of each set of coils comprises means for processing the signal delivered by the detector and a power amplifier working continuously regardless of the position of the said switch-over means, which are placed upstream of each power amplifier, the power amplifier, which is not switched over the corresponding signal processing means, working with a quiescent current which is low compared with the current of the power amplifier switched over to the corresponding signal processing means.

According to one embodiment, each power amplifier comprises two bridge-mounted power transistors and two diodes and the power transistors are phase-controlled by pulses whose width is dependent on the signal delivered by the corresponding position detector and processed by the corresponding signal processing means, when the power amplifier considered is switched over to said corresponding signal processing means.

According to one special feature of the invention, means are provided to detect the difference between the output signal of a detector sensing the position of the movable member mounted on the bearing, and a desired value, and the signal controlling the switch-over means is dependent on said difference.

According to another special feature of the invention, means are provided to measure the current in the coils of each set of coils and the signal controlling the switch-over means is dependent on the signal supplied from said current measuring means.

The signal controlling the switch-over means can also be dependent on the comparison signal supplied by the signal comparison means in corresponding points of the signal processing means associated with the two sets of coils.

The present invention will be more readily understood on reading the following description with reference to the accompanying drawings in which:

FIG. 1 is a general block diagram of a device controlling the first set of coils of an active electromagnetic bearing comprising two electromagnets, each one equipped with a first and second set of electromagnet coils according to the invention.

FIG. 2 is a general block diagram of a device controlling the first and second sets of electromagnet coils of a redundant active electromagnetic bearing according to the invention.

FIG. 3 is a diagram of an example of power amplifier cooperating with electromagnet coils in an electromagnetic bearing according to the invention.

FIG. 1 gives a general diagram of the arrangement of electromagnet control circuits 20 in an active electromagnetic bearing designed for example to support a rotor radially (but the disposition would be just the same for an axial bearing). The two electromagnets 20 shown in the diagram of FIG. 1 constitute a pair of actuators, each one cooperating with the rotor inside the same radial plane, and being situated diametrically opposite each other so as to sum up their effects. The two electromagnets 20 of one couple are controlled from the same detector or group of detectors 4 placed in the vicinity of the plane of action of the electromagnets and provided for sensing the position of the rotor with respect to the support frame near the actuators constituted by the electromagnets 20.

Each electromagnet 20 comprises a first set of two coils $H_1$ mounted on an armature 23 constituted of laminated plates in ferromagnetic material. The two coils constituting the set $H_1$, are disposed in series on two pairs of successive poles and are wound in the same direction. According to the invention, each electromagnet further comprises a second set of two coils $H_2$ also wound in series on the two successive pairs of poles of the armature 23. The two coils of set $H_2$ are however wound in opposite direction one with respect to the other so that, on the whole, each electromagnet 20 comprises a first pair of coils wound in the same direction, and a second pair of coils wound in the opposite direction, each pair comprising one coil of $H_1$ and one coil of $H_2$. Each series of coils $H_1$ or $H_2$ is associated to a set of servo-control circuits cooperating with a detector 4. For comprehension purposes, FIG. 1 only shows the servo-control loops associated to the coils $H_1$. It is especially noted that a set of coils $H_1$ of a first electromagnet cooperates with a power amplifier 19 and some elements of circuits proper, but can be associated to a servo-control system comprising elements in common with those of another servo-control system of a corresponding set of coils $H_1$ belonging to an electromagnet paired with the first electromagnet. On the contrary, the servo-systems controlling the sets of coils $H_1$ are really independent of the servo-system controlling the sets of coils $H_2$ so that there really is redundancy as far as the electronic circuits are concerned.

The elements which in the example illustrated in the diagram of FIG. 1 can constitute a servo-control system associated to a set of electromagnet coils $H_1$ of an active magnetic bearing, will now be described in more detail.

Reference 1 designates a stabilized power supply circuit for example of ±15 V supplying the different electronic circuits of the control systems, whereas reference 2 designates a power supply (for example 85 V, 300 A or 425 V, 30 A) designed to ensure the supply of the power amplifiers 19 directly associated to the coils $H_1$. The circuit 3 is constituted by an oscillator (at 50 kHz for example) for supplying the detectors and synchronizing the modulators 18 associated to the power amplifiers 19.

The rotor position detector device can comprise detectors of very different types. However, this device is advantageously constituted by bridge-mounted detectors 4 of the inductance type. The circuit 5 represents a demodulator circuit controlled by the oscillator 3 to ensure the rectification of the signals delivered by the detectors 4. The circuit 7 designates a control circuit ensuring the smooth passage from one position of the rotor supported by relief bearings to a position of the rotor supported by electromagnetic bearings. The signals outputted by the circuit 7 are added in the adder 6 to the signals outputted by the demodulator 5. The circuits 8 and 9 designate respectively an integrator for increasing the amplification and as a result the stiffness of the bearing at the very low frequencies (below 2 Hz), and a stabilizer circuit introducing an advance of phase necessary to obtain a good damping of the critical frequencies of the suspension and of the rotor. The signals delivered by the integrator 8 and by the stabilizer circuit 9 are applied to an adder 10 whose output is connected to a low-pass filter 11, designed to limit the frequency range of the suspension subjected to a regulation and to prevent any spurious resonances. The filter 11 can for example comprise a second order low-pass filter which may be associated with band-pass filters.

The multipliers 12 associated to adder 13 and to the voltage source 14 are used to compensate the fact that the force exerted by a bearing is dependent on the size of the air gap. For example, in each supplying branch of electromagnet coils $H_1$ is effected a multiplication by a factor $(x+e_o)$ wherein x is the difference signal delivered by the position detector 4 and $e_o$ is the size of an average air gap.

The circuit 15 is a balancing circuit controlling the opposite phases of the amplifiers 19 of two branches associated with the two electromagnets of one pair. The circuits 16 are square root-extracting amplifiers taking into account the square dependence of the force of a bearing with respect to the induced current.

Amplifiers 17 designed to limit the speed of variation of the input signal are used to prevent excessive overloads of the power amplifiers 19 in case of very strong disturbing signals. The circuits 18 constitute modulators for the processed input signal supplied from the detector 4 and ensure a modulation (for example at 17 kHz) permitting a pulse-width control of the power amplifiers 19.

The structure of the power amplifiers 19 controlling the coils $H_1$ or the redundant coils $H_2$ is shown in more detail on the diagram of FIG. 3, as well as the arrangement of a first set of coils $H_1$ and of a second set of coils $H_2$ on the same armature 23.

As already indicated hereinabove, a first coil $H_{11}$ of the set $H_1$ and a first coil $H_{21}$ of the set $H_2$ are wound in parallel in the same direction on a first double-pole circuit of the armature 23. A second coil $H_{12}$ of the set $H_1$ and a second coil $H_{22}$ of the set $H_2$ are wound on a second double-pole circuit of the armature 23, but in the opposite direction. The set $H_1$ of coils $H_{11}$, $H_{12}$ is connected to points $P_1$, $P_2$ of a power amplifier 19 and the set $H_2$ of coils $H_{21}$, $H_{22}$ is connected to points $P_1$, $P_2$ of a second power amplifier 19.

Each amplifier 19 presents a bridge configuration and comprises two switch-over elements 191, 192. The input of the bridge is supplied with D.C. voltage (for example 85 V) from supply source 2 via fuses 22 capable of disconnecting the amplifier in case of simultaneous short-circuit of the two switch-over elements 191, 192.

The bridge output (points $P_1$, $P_2$) is connected to a set of exciting coils $H_1$, or $H_2$ of a bearing electromagnet. One of the branches of the bridge connected to the positive pole of the supply source and to one end of the set of exciting coils $H_1$ (or $H_2$ respectively) comprises the collector-emitter junction of a first power transistor constituting the first switch-over element 191, whereas another branch of the bridge, connected to the negative pole of the supply source and to the other end of the set of exciting coils $H_1$ (or $H_2$ respectively) comprises the collector-emitter junction of a second power transistor constituting the second switch-over element 192. The two other branches of the bridge each comprising a power diode 193, 194 respectively. Transistors 191, 192 thus constitute a series circuit with the coils $H_1$ (or $H_2$ respectively) which is traversed by a current supplied from the supply source when the transistors 191, 192 are conductors, whereas the diodes 193, 194 themselves connected in opposition with respect to the polarities of the supply source, the diode 193 having its cathode connected to the positive pole of the supply source and the diode 194 having its anode connected to the negative pole of said supply souce.

The power transistors 191, 192 are phase-controlled by the modulator circuit 18 at a frequency of about 17 kHz in the illustrated example. The transistors 191, 192 are alternately and in phase switched on and off so that the voltage at terminals $P_1$, $P_2$ of the coils $H_1$ (or $H_2$) also changes polarity at the same switch-over frequency. If the opening time of the first branch of the bridge which comprises the transistor 191 (and which also corresponds to the opening time of the second branch of the bridge comprising the transistor 192) is equal to the closing time of said first branch (which also corresponds to the closing time of the second branch), the mean current in the corresponding coils $H_1$ or $H_2$ is nil. Each bridge constituting a power amplifier 19 is controlled by a modulator 18 which causes the opening time/closing time ratio of the transistors 191, 192 to vary in order to allow a suitable flow of current in the coils $H_1$ or $H_2$, depending on the signals supplied from the detectors 4 and processed by the processing circuits associated therewith. The modulator thus receives a signal in relation to the signal supplied from the detectors 4 and an alternative voltage signal supplied from the oscillator 3 and synchronous with the signal applied to circuits 5.

Generally speaking, when in service, each set of coils $H_1$ or $H_2$ remains connected to the supply source 2, but only a set of coils $H_1$ $H_2$ is controlled by the modulator 18 associated therewith whilst the uncontrolled set of coils is traversed by a low quiescent current. The switch-over between the coils $H_1$ or $H_2$ is thus achieved upstream of the power amplifiers 19 and via switches 21.

The redundant electronic circuits cooperating with a joint electromagnet 20 equipped with two sets of coils $H_1$ or $H_2$ associated with the same armature 23, works as described hereinafter with reference to FIG. 2.

Each separate set of coils $H_1$, $H_2$ is associated with its own servo-control loop composed of the following parts:

a detector assembly $I_1$, $I_2$ comprising a detector 4 of the inductance type for sensing the position of a rotor with respect to a stator, the detector being associated with an oscillator 3 and with a demodulator 5.

a device $II_1$, $II_2$ for processing the signal supplied from the detector assembly, comprising circuits such as circuits 6 to 18 of FIG. 1.

switch-over means $III_1$, $III_2$, comprising a switch 21.

a power amplifying stage $IV_1$, $IV_2$ comprising the amplifier 19 and its associated protection 22.

Due to the fact that the attractive force exerted by the electromagnets is proportional to the square of the exciting current, it is independent of the sign of said current. When switching-over with stages $III_1$, $III_2$, between a first servo control loop normally used associated with the coils $H_1$ and a second redundant servo-control loop associated with the coils $H_2$, the direction of the magnetic flux changes inside the electro-magnet constituted by the pair of poles carrying the coils $H_{12}$, $H_{22}$. As a result, the two servo-control loops must not work simultaneously, as said flux would be duplicated in the electromagnet element constituted by the coils $H_{11}$, $H_{21}$ and the coils $H_{12}$, $H_{22}$. On the contrary, one of the sets of coils $H_1$ or $H_2$ can be short-circuited, (or left in open circuit) without this affecting in any way the operation of the other set of coils. Thus, it suffices, in cases of failure in one of the control loops, to switch-over the control of the power amplifiers 19 with the switch 21 in order to stop the modulated control of the transistors of amplifier 19 of the faulty loop and to initiate the modulated control of the transistors of the power amplifier 19 of the other loop. The non-controlled power amplifier, on the other hand, can continue to be power-supplied and to supply to the set of coils associated therewith, a low quiescent current which does not affect the operation of the other set of coils.

The fault-detecting means used for detecting a fault in a control loop or in the set of coils $H_1$ associated therewith, and for switching over to the redundant assembly associated with the other set of coils $H_2$ are described hereafter.

The assembly comprising a control loop such as $I_1$, $II_1$, $III_1$, $IV_1$ and the set of coils $H_1$ associated therewith, is designed to ensure that a rotor is held in a predetermined normal position. After what, a monitoring of the output signal from the position detecting stage $I_1$ enables to determination of whether or not this signal differs much from the value corresponding to the normal position. In the event of big differences, a control circuit 25 delivers control signals actuating the switching means $III_1$ and $III_2$ so as to pass from the first control loop to the second redundant control loop. Control means such as a voltmeter 24 associated with display means 34 and an element of the circuit 25 permanently compare the output signals from the detection stages $I_1$ and $I_2$ and help to generate a swtich-over control signal in case a preset value is exceeded. Control means 26, 36 associated with an extra detection stage $I_3$ independent of the two control loops considered can also enable determination of whether if a faulty operation comes from the detector $I_1$ proper or from circuits $II_1$, $III_1$ or $IV_1$.

The detection of faults is also conducted at the level of the coils $H_1$ (and $H_2$ respectively) owing to circuits 28, 29 measuring the current flowing through the coils $H_1$. The circuits 28, 29 connected to the control circuit 25 enable to switch-over to the last control loop in cases of excess current in the coils $H_1$ or of too sudden a variation in the strength of the current flowing through said coils. A voltmeter 27 also measures the A.C. voltage (at 17 kHz in the illustrated example) at the output of the power amplifier 19 and can help detect working faults. Similar measuring circuits 27, 28, 29 are connected on the coils $H_2$ and cooperate with signalling means 37, 38, 39 respectively to monitor the operation of the second control loop, which is still working. However, when the control loop linked to the coils $H_1$ is in operation (switch 21 of the stage $III_1$ in closed position), the control loop linked to the coils $H_2$ works with the switch 21 of the stage $III_2$ in open position and the coils $H_2$ are traversed by only a low quiescent current which does not disturb the operation of the power amplifier $IV_1$ of the other loop, of which the transistors are controlled by pulses. The ammeters 28, 29 enable control so that the quiescent current in the power amplifier $IV_2$ and the coils $H_2$ does not exceed a predetermined value. Control means, not shown, also enable to comparison of the signals at the output of the signal-processing stages $II_1$ and $II_2$, before the switches $III_1$ and $III_2$. The circuits $II_1$ and $II_2$ as well as the detection stages $I_1$ and $I_2$ indeed remain permanently in operation. In the event of a fault being detected by the circuits 24, 27, 28 or 29, the control circuit 25 controls the switch-over of the two switches 21 of the stages $III_1$, and $III_2$, with the opening of stage $III_1$ and the closing of stage $III_2$. The control loop linked to the coils $H_2$ can then control said coils in relation to the signals supplied from the detections stage $I_2$ and enable the electromagnetic bearing to continue to play its part free of any disturbances vis-à-vis the electromagnetically suspended rotor.

What is claimed is:

1. A redundant active electromagnetic bearing for supporting a movable member, comprising:
a first set of electromagnet coils wound on an armature having double-pole parts and a second set of electromagnet coils would on said armature, a first and a second detection device for sensing the position of the movable member, a first control circuit connected to said first detection device and capable of being connected to said first set of coils for controlling the supply of said first set of coils in response to signals delivered by the first detection device in order to keep the movable member in a predetermined position, a second control circuit connected to said second detection device and capable of being connected to said second set of coils for controlling the supply of said second set of coils in response to signals delivered by the second detection device in order to keep the movable member in a predetermined position, and switch-over means being provided for connecting either the first set of coils with the first control circuit or the second set of coils with the second control circuit in response to a control signal, wherein the first and the second sets of coils are so placed on said armature that on each double-pole part of said armature are wound one coil of the first set and one coil of the second set and that the successive coils of the first set are all wound in the same direction whereas the coils of the second set which duplicate the coils of the first set are alternately wound in the same direction and in opposite directions with respect to the corresponding coils of the first set.

2. The electromagnetic bearing as claimed in claim 1, wherein said bearing comprises means for detecting the differences between the output signals of said first and second detection devices and a desired value, and the switch-over means are controlled by a signal which is dependent on said differences.

3. The electromagnetic bearing as claimed in claim 2, wherein said bearing comprises means for measuring the current in the coils of the first and second sets of coils and the signal controlling the switch-over means is dependent on the signal supplied from said current measuring means.

4. The electromagnetic bearing as claimed in claim 1, wherein the first and second control circuits of the first and second sets of coils each comprise means for processing the signal delivered by the respective detection device and a power amplifier, said power amplifier being placed downstream of said switch-over means working continuously regardless of the position of the said switch-over means, the power amplifier which is not switched over to the corresponding signal processing means working with a quiescent current which is low compared with the current of the power amplifier switched over to the corresponding signal processing means.

5. The electromagnetic bearing as claimed in claim 4, wherein said bearing comprises means for comparing the signals in corresponding points of the signal processing means which are associated with the first and the second sets of coils respectively.

6. The electromagnetic bearing as claimed in claim 5, wherein each power amplifier of the first and second control circuits comprise two bridge-mounted power transistors and two diodes and when one of said power amplifiers is connected to the corresponding signal processing means by said switch-over means, the power transistors of said power amplifier are phase-controlled by pulses whose width is dependent on the signal delivered by the corresponding position detection device and processed by the corresponding signal processing means.

* * * * *

UNITED STATES PATENT AND TRADEMARK OFFICE
CERTIFICATE OF CORRECTION

PATENT NO. : 4,392,693

DATED : July 12, 1983

INVENTOR(S) : HELMUT HABERMANN, ET AL.

It is certified that error appears in the above-identified patent and that said Letters Patent is hereby corrected as shown below:

Column 6, line 43, delete "to";
          line 56, delete "if".
Column 7, line 15, delete "to".

Signed and Sealed this

Thirteenth Day of September 1983

[SEAL]

Attest:

GERALD J. MOSSINGHOFF

Attesting Officer     Commissioner of Patents and Trademarks